(12) United States Patent
Wen et al.

(10) Patent No.: US 12,386,310 B2
(45) Date of Patent: Aug. 12, 2025

(54) INFORMATION PROCESSING DEVICE, INFORMATION PROCESSING METHOD, PROGRAM, AND HOLOGRAM DISPLAY SYSTEM

(71) Applicant: SONY GROUP CORPORATION, Tokyo (JP)

(72) Inventors: Shihhao Wen, Los Angeles, CA (US); Masato Akao, Kanagawa (JP); Yoshiaki Kouyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 377 days.

(21) Appl. No.: 17/922,726

(22) PCT Filed: May 26, 2021

(86) PCT No.: PCT/JP2021/019938
§ 371 (c)(1),
(2) Date: Nov. 1, 2022

(87) PCT Pub. No.: WO2021/246255
PCT Pub. Date: Dec. 9, 2021

(65) Prior Publication Data
US 2023/0350344 A1    Nov. 2, 2023

(30) Foreign Application Priority Data
Jun. 2, 2020 (JP) ................. 2020-096399

(51) Int. Cl.
*G03H 1/04*    (2006.01)
*G03H 1/02*    (2006.01)
*G06F 3/01*    (2006.01)
*G06T 7/50*    (2017.01)
*G06V 20/70*   (2022.01)

(52) U.S. Cl.
CPC ................. *G03H 1/04* (2013.01); *G03H 1/02* (2013.01); *G06F 3/013* (2013.01); *G06T 7/50* (2017.01);
(Continued)

(58) Field of Classification Search
CPC .... G03H 1/04; G03H 1/02; G03H 2001/0224; G03H 1/00; G03H 1/0005;
(Continued)

(56) References Cited

U.S. PATENT DOCUMENTS 6,023,353 A       2/2000  Ori
2005/0207313 A1   9/2005  Handschy et al.
(Continued)

FOREIGN PATENT DOCUMENTS

JP    H06-110371 A     4/1994
JP    2000-322594 A   11/2000
(Continued)

*Primary Examiner* — Arnel C Lavarias
(74) *Attorney, Agent, or Firm* — Paratus Law Group, PLLC

(57) ABSTRACT

User experience is improved. An information processing device includes: a grouping unit (21) that groups a plurality of pixels configuring one or more objects included in one piece of image data into one or more groups; a phase adjustment unit (22) that allocates, to the plurality of pixels, a phase pattern having a phase difference different for each of the one or more groups; and a calculation unit (30) that generates hologram data from the image data to which the phase pattern is added.

18 Claims, 18 Drawing Sheets

(52) U.S. Cl.
CPC ..... *G06V 20/70* (2022.01); *G03H 2001/0224* (2013.01)

(58) Field of Classification Search
CPC ......... G03H 2001/0088; G03H 1/0443; G03H 2001/0454; G03H 1/08; G03H 1/0841; G03H 2001/085; G03H 1/0866; G03H 2001/0883; G03H 1/0891; G03H 1/22; G03H 1/2202; G03H 2001/2223; G03H 2001/2281; G03H 2210/00; G03H 2210/40; G03H 2210/44; G03H 2210/441; G03H 2226/00; G03H 2226/02; G03H 2226/05; G06F 3/013; G06T 7/50; G06V 20/70; G06V 20/20; G06V 20/40
USPC ...... 359/9, 1, 13, 21, 22, 28, 29, 32, 33, 35; 430/1, 2
See application file for complete search history.

(56) References Cited

U.S. PATENT DOCUMENTS

| | | |
|---|---|---|
| 2010/0014134 A1 | 1/2010 | Cable |
| 2015/0077818 A1 | 3/2015 | Tsang |
| 2015/0185523 A1* | 7/2015 | Matsumoto ........... G02F 1/1313 359/238 |
| 2016/0103321 A1* | 4/2016 | An ....................... H04N 13/398 348/40 |
| 2020/0150450 A1* | 5/2020 | Wiersma .............. H04N 9/3164 |

FOREIGN PATENT DOCUMENTS

| | | |
|---|---|---|
| JP | 2005-195803 A | 7/2005 |
| JP | 2008-525832 A | 7/2008 |
| JP | 2008-544307 A | 12/2008 |
| JP | 2010-501903 A | 1/2010 |
| JP | 2011-528132 A | 11/2011 |
| WO | WO 2019/076963 A1 | 4/2019 |

* cited by examiner

INFORMATION PROCESSING DEVICE, INFORMATION PROCESSING METHOD, PROGRAM, AND HOLOGRAM DISPLAY SYSTEM

CROSS REFERENCE TO PRIOR APPLICATION

This application is a National Stage Patent Application of PCT International Patent Application No. PCT/JP2021/019938 (filed on May 26, 2021) under 35 U.S.C. § 371, which claims priority to Japanese Patent Application No. 2020-096399 (filed on Jun. 2, 2020), which are all hereby incorporated by reference in their entirety.

FIELD

The present disclosure relates to an information processing device, an information processing method, a program, and a hologram display system.

BACKGROUND

A computer-generated hologram (hereinafter, also referred to as CGH) is a technique for generating holograms only by calculation. Such a technique is required since it is often difficult to store a hologram of a scene directly.

Conventionally, a random phase is added to an input pixel or an input voxel before a wave propagation process in which information propagated by a pixel or a voxel spreads over a wide area on a hologram. When the information spreads to a wide range of a hologram plane, a reproduced image has a shallower depth of field, and robustness against artifacts and dust attached to the lens of the optical system is improved.

However, adding a random phase to the input image induces other types of noise on a reproduction field. Such noise is called speckle noise and occurs substantially randomly on the reproduction field. Many techniques for reducing speckle noise are based on time-consuming iterative algorithms that are disadvantageous in real-time performance.

CGH calculation algorithms without using a random phase are also developed, and a reproduced image obtained by using such a method which does not use a random phase can achieve a considerably high image quality without speckle noise. In a case where a random phase is not used, a hologram having information from a sample point in a space concentrates in a narrow area. Therefore, the light beam of the reproduced image becomes thin, and thus, the depth of field of the reproduced image becomes deep. In this regard, conventional techniques for alleviating these two phenomena have been developed.

CITATION LIST

Patent Literature

Patent Literature 1: JP 2005-195803 A

SUMMARY

Technical Problem

However, the two phenomena described above always have a trade-off relationship. Therefore, in the related art, two problems of poor image resolution and a deep depth of field cannot be simultaneously reduced for the same image, and it is difficult to improve user experience.

In this regard, the present disclosure proposes an information processing device, an information processing method, and a program capable of improving user experience.

Solution to Problem

To solve the above-described problem, an information processing device according to one aspect of the present disclosure comprises: a grouping unit that groups a plurality of pixels configuring one or more objects included in one piece of image data into one or more groups; a phase adjustment unit that allocates, to the plurality of pixels, a phase pattern having a phase difference different for each of the one or more groups; and a calculation unit that generates hologram data from the image data to which the phase pattern is added.

DESCRIPTION OF EMBODIMENTS

Hereinafter, embodiments of the present disclosure will be described in detail on the basis of the drawings. Incidentally, in each of the following embodiments, the same reference signs are given to the same portions, and duplicate description will be omitted.

The present disclosure will be described according to the order of items described below.

1. First Embodiment
   1.1 Outline
   1.2 Schematic configuration example of information processing device
   1.3 Operation example of information processing device
   1.4 Action and effect
2. Second Embodiment
3. Third Embodiment
4. Fourth Embodiment
5. Fifth Embodiment
6. Hardware configuration

1. First Embodiment

Hereinafter, an information processing device, an information processing method, and a program according to a first embodiment will be described in detail with reference to the drawings.

1.1 Outline

Figure 1:
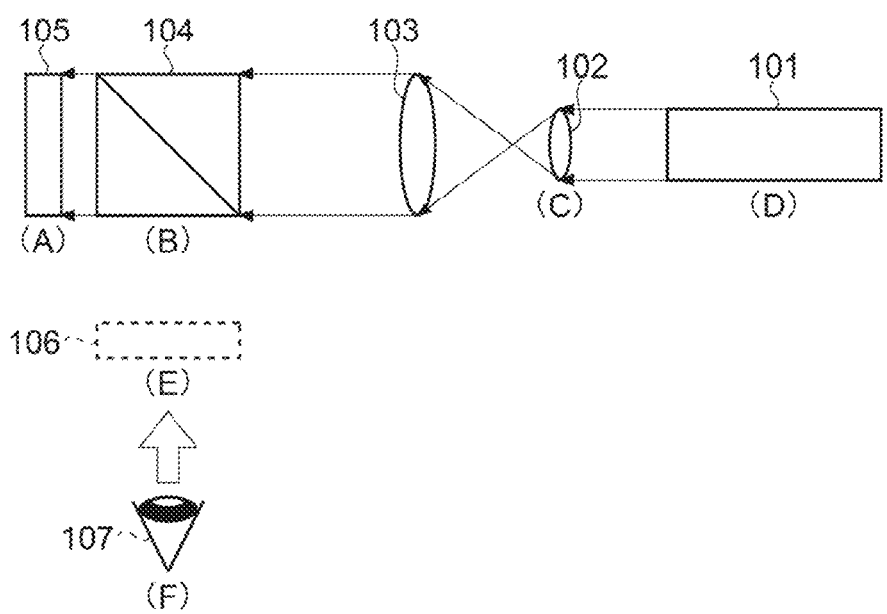
FIG. 1 is a schematic diagram for explaining an outline of a hologram display system according to a first embodiment.

First, the outline of the present embodiment will be described. FIG. 1 is a schematic diagram for explaining the outline of a hologram display system according to the present embodiment. Note that, in FIG. 1 and subsequent drawings, (A) to (F) indicate respective schematic positions.

As illustrated in FIG. 1, in the present embodiment, the hologram display system including a light source 101, an enlargement optical system including a plurality of lenses 102 and 103, a beam splitter 104, and a spatial light modulator 105 is illustrated.

In FIG. 1, a laser light L1 from the light source 101 is converted into a coherent light L2 having a beam diameter enlarged by the enlargement optical system including the plurality of lenses 102 and 103. The coherent light L2 passes through the beam splitter 104 and enters the spatial light modulator 105.

In the present embodiment, the spatial light modulator 105 is illustrated by a reflective spatial light modulator. The coherent light L2 is modulated by the spatial light modulator 105 to form a hologram at a point in a predetermined region in a space.

The beam splitter 104 projects a hologram 106 reproduced by the spatial light modulator 105, for example, at a position E in the space so that a user 107 can observe the hologram. The user 107 present at a position F can view the hologram 106 superimposed on the real space visible through the beam splitter 104 by observing the direction of the position E.

As described above, the hologram display system according to the present embodiment can provide a user experience of causing a virtual object or the like to appear in the real space, rendering a body in the real space with a special effect or the like, presenting predetermined information to the user, or the like.

Note that, in the above configuration, a display device 50 may be, for example, an optical see-through type head mounted display (hereinafter, referred to as an AR HMD). In addition, a pre-processing unit 20, a CGH calculation unit 30, and a post-processing unit 40 may configure an information processing device in the hologram display system. A part or all of the information processing device may be arranged in the display device 50, that is, in the AR HMD, or may be arranged in a server (including a cloud server) or the like connected to the display device 50 via a predetermined network (for example, a mobile communication network including a local area network (LAN), the Internet, long term evolution (LTE), wireless fidelity (WiFi), 4G, 5G, or the like).

1.2 Schematic Configuration Example of Information Processing Device

Figure 2:
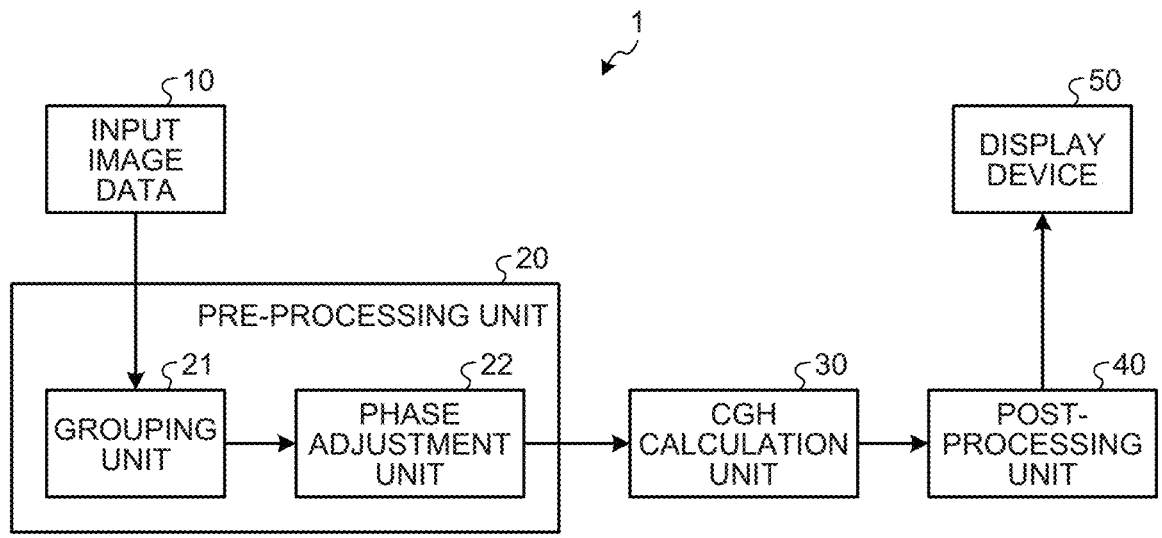
FIG. 2 is a block diagram illustrating a schematic configuration example of an information processing device according to the first embodiment.

Next, a schematic configuration example of the information processing device included in the hologram display system according to the present embodiment will be described in detail with reference to the drawings. FIG. 2 is a block diagram illustrating the schematic configuration example of the information processing device according to the present embodiment. As illustrated in FIG. 2, an information processing device 1 includes the pre-processing unit 20, the CGH calculation unit 30, and the post-processing unit 40.

(Pre-Processing Unit 20)

The pre-processing unit 20 includes a grouping unit 21 and a phase adjustment unit 22, and executes pre-processing described later on input image data (input image data 10 described later).

(CGH Calculation Unit 30)

The CGH calculation unit 30 generates hologram data to be input on an SLM plane by calculation from the input image data pre-processed by the pre-processing unit 20.

(Post-Processing Unit 40)

The post-processing unit 40 converts the hologram data generated by the CGH calculation unit 30 into a hologram signal displayable on the display device 50.

(Display Device 50)

The display device 50 outputs the hologram signal converted by the post-processing unit 40 to stereoscopically display the hologram of the object reproduced by the input image data to the user.

1.3 Operation Example of Information Processing Device

Figure 3:
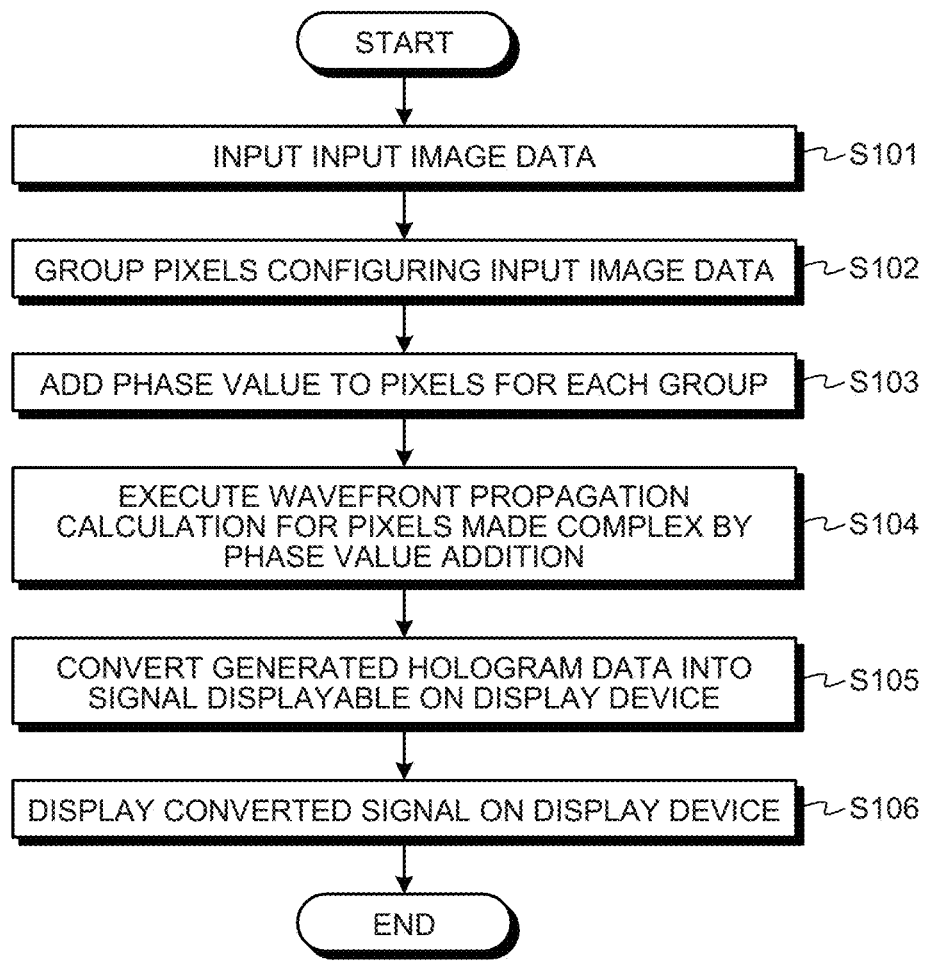
FIG. 3 is a flowchart illustrating an operation example of the information processing device according to the first embodiment.

Next, an operation example of the information processing device 1 according to the present embodiment will be described in detail with reference to the drawings. FIG. 3 is a flowchart illustrating the operation example of the information processing device according to the present embodiment.

As illustrated in FIG. 3, in the present operation, in Step S101, first, the information processing device 1 inputs information (hereinafter, referred to as input image data) regarding an image to be displayed as a hologram. In the present embodiment, the input image data 10 may be, for example, two-dimensional image data, 2.5-dimensional image data, three-dimensional image data, or the like. Note that the 2.5-dimensional image data may be, for example, image data including color information of three primary colors of RGB and depth information (also referred to as distance information) for each pixel or voxel (hereinafter, simply referred to as a pixel). In addition, the three-dimensional image data may be, for example, image data including color information of three primary colors of RGB and three-dimensional information.

Figure 4:
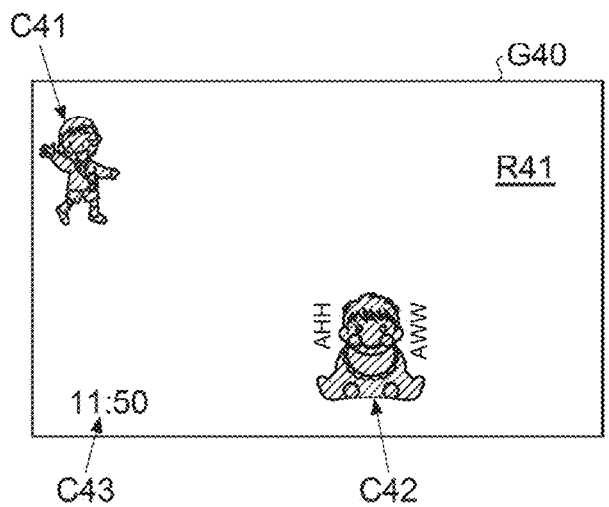
FIG. 4 is a diagram illustrating an example of an object image configuring input image data according to the first embodiment.
Figure 5:
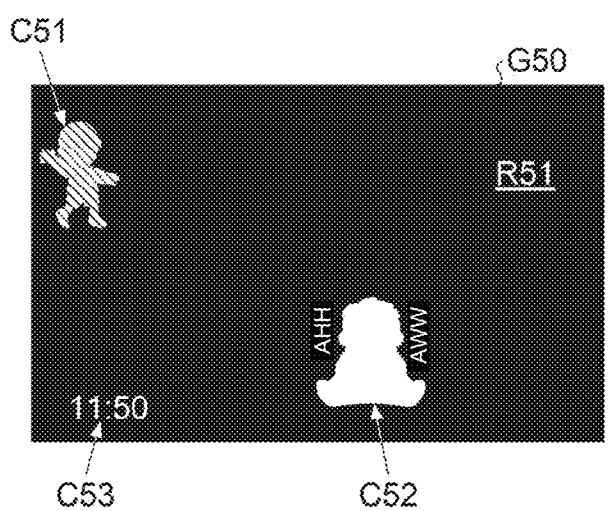
FIG. 5 is a diagram illustrating an example of a depth image configuring the input image data according to the first embodiment.

In the following description, a case where 2.5-dimensional image data is input as the input image data 10 will be described as an example. FIGS. 4 and 5 are examples of the input image data according to the present embodiment, FIG. 4 illustrates image data (referred to as an object image) including RGB color information for each pixel in the input image data 10, and FIG. 5 illustrates image data (hereinafter, referred to as a depth image) including depth information for each pixel.

An object image G40 illustrated in FIG. 4 includes an object C41 of a boy positioned at the upper left, an object C42 of a baby positioned at the lower right, and an object C43 of a clock positioned at the lower left. In the following description, in a case where an object (the objects C41 and C42 in the present example) to be displayed for a body in the real space and an object (the object C43 in the present example) to be displayed on a virtually set screen are distinguished from each other, the object to be displayed for the body in the real space is referred to as a virtual object (including a staging effect and the like) (hereinafter, referred to as an AR object), and the object to be displayed on the screen virtually set on a predetermined plane in the real space is referred to as an OSD object. Note that, in FIG. 4, a white background region R41 indicates a transparent point having no color information, that is, a region where no object is present.

A depth image G50 illustrated in FIG. 5 includes a region C51 corresponding to the AR object C41 of the boy positioned at the upper left, a region C52 corresponding to the AR object C42 of the baby positioned at the lower right, and a region C53 corresponding to the OSD object C43 of the clock positioned at the lower left. In FIG. 5, a black-painted region R51 indicates a region to which the depth information is not added or to which the depth information of the farthest point is added.

In the depth image, the depth information added to each point expressed as a pixel may be depth information corresponding to an actual distance from the position of the user 107 in the real space to the position corresponding to each pixel in the real space.

In the present description, the depth information corresponding to a distance of 500 mm from the user 107 is added to the region C53 corresponding to the OSD object C43 of the clock positioned at the lower left. The depth information corresponding to a distance of 1000 mm from the user 107 is added to the region C52 corresponding to the AR object C42 of the baby positioned at the lower right, and the depth information corresponding to a distance of 2000 mm from the user 107 is added to the region C51 corresponding to the AR object C41 of the boy positioned at the upper left.

Note that the input image data 10 may include map information regarding the type of an image to be reproduced as a hologram.

Figure 6:
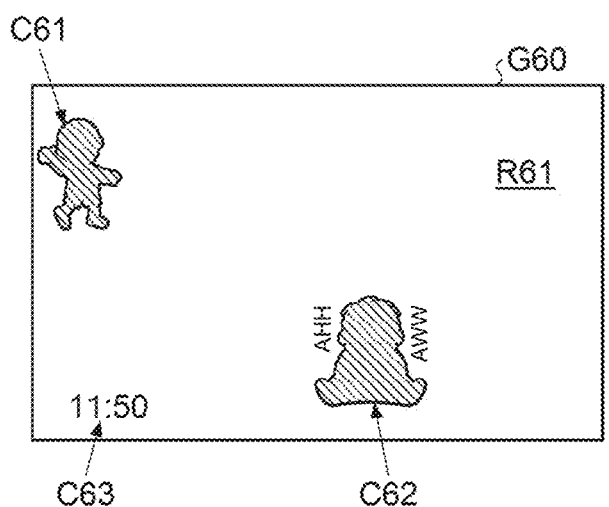
FIG. 6 is a diagram illustrating an example of a label image configuring the input image data according to the first embodiment.

In the present embodiment, the input image data 10 may include label information regarding an object included in an object image. In the example illustrated in FIGS. 4 and 5, as illustrated in FIG. 6, the label information may be added to regions C61 to C63 respectively corresponding to the AR object C41 of the boy, the AR object C42 of the baby, and the OSD object C43 of the clock. Hereinafter, an image on which the regions C61 to C63 to which the label information is added are mapped is referred to as a label image G60. Note that, in FIG. 6, a white region R61 indicates a region to which the label information is not added.

In FIG. 6, the region C61 is a region to which the label information indicating the AR object C41 of the boy is added, the region C62 is information to which the label information indicating the AR object C42 of the baby is added, and the region C63 is information to which the label information indicating the OSD object C43 of the clock is added. Note that, in FIG. 6, the regions C61 and C62 corresponding to the objects C41 and C42 to be superimposed on the body in the real space are indicated by hatching with oblique lines, and the region C63 corresponding to the on-screen object C43 is indicated in black.

In Step S102 of FIG. 3, the points (corresponding to pixels) (hereinafter, described as pixels) configuring the input image data 10 input in Step S101 are grouped into one or more groups. An algorithm for grouping the pixels may be variously changed according to an actual use case. In the present embodiment, since it is difficult to simultaneously achieve high resolution and a shallow depth of field, the pixels requiring high resolution and the pixels requiring a shallow depth of field are grouped into different groups, and are treated differently.

For example, with respect to an on-screen object such as the OSD object C43 which is the clock, it is considered that the user desires to be able to view the on-screen object clearly regardless of the distance to which the user's view-point is aligned. Therefore, the on-screen object desirably has a high resolution and a deep depth of field.

On the other hand, an AR object such as the AR objects C41 and C42 is desirably displayed at a position close to the body on the real space corresponding to the AR object, and for this purpose, it is necessary to have the same depth of field as that of the body on the real space. That is, a shallow depth of field is important for the AR object.

As described above, the OSD object is required to have a high resolution and a deep depth of field, and the AR object is required to have a shallow depth of field even at the expense of the resolution. In this regard, in the present embodiment, the pixels of the input image data 10 are grouped into one or more groups on the basis of the label information. For example, the input image data 10 is classified into a group (hereinafter, referred to as an OSD object group) of OSD objects and a group (hereinafter, referred to as an AR object group) of AR objects. Note that a transparent region where no object exists does not need to be grouped, and thus can be omitted.

In Step S103 of FIG. 3, the phase adjustment unit 22 of the pre-processing unit 20 adds phase values to all the pixels of the input image data 10. At that time, in the pixels belonging to the AR object group and the pixels belonging to the OSD object group, phase values of different features are added thereto, so that the reproduced pixels have different features. Note that the phase value may not be added to a pixel that does not belong to either the AR object group or the OSD object group.

As a method of adding a phase value to each pixel, for example, a repeated random phase (RRP) method can be used. In the RRP method, first, patches (hereinafter, referred to as a random phase patch) of a random phase pattern to be allocated to a region called a cell of a predetermined size (for example, m pixels×n pixels) are generated. The random phase pattern may be, for example, a pattern in which a difference between the phase values added to adjacent pixels is a random value which is not a fixed value.

Figure 7:
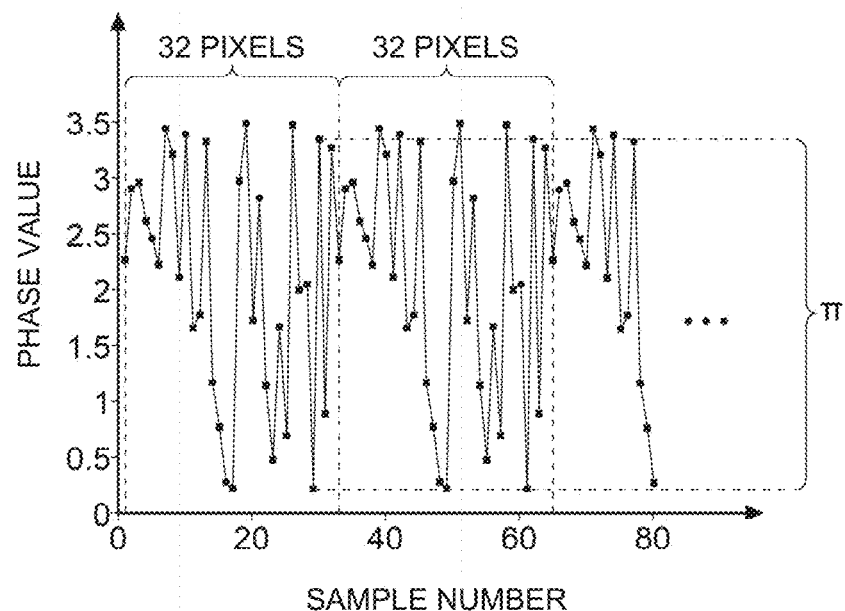
FIG. 7 is a diagram illustrating an example of a random phase patch according to the first embodiment.

In the present example, a random phase patch having a maximum phase difference of π in the patch is allocated to a plurality of pixels included in one cell. Such allocation of the random phase patches in units of cells is executed for the entire range of the input image data 10. FIG. 7 is a diagram illustrating an example of a random phase patch allocated to one cell in a case where a cell size is 1 pixel×32 pixels. In FIG. 7, a horizontal axis represents the numbers (sample numbers) of the pixels arranged in a horizontal direction in the input image data, and a vertical axis represents the phase value added to each pixel.

The random phase patch of 32 pixels illustrated in FIG. 7 is repeated for the horizontal column of the pixels of the input image data 10. This repetition is applied to all columns of the input image data 10.

By using the square root of the color intensity of each pixel in the object image G40 illustrated in FIG. 4, the input image data 10 is converted from a real value image into a complex value image having an amplitude according to newly added phase information.

The random phase pattern can scatter light to widen a region which the light after wave propagation forms on the SLM plane. That is, high-frequency phase information in the input image space scatters light to widen the region of light formed on the SLM plane, and low-frequency phase information scatters light to narrow the region of light formed on the SLM plane.

A high-frequency phase contributes to making the depth of field shallower by further scattering a light pattern on the SLM plane. Therefore, it can be said that a high-frequency phase patch is more suitable for the AR object group.

On the other hand, a low-frequency phase contributes to increasing the depth of field by reducing the light pattern on the SLM plane. Therefore, it can be said that a low-frequency phase patch is more suitable for the OSD object group.

As can be seen from the random phase patch illustrated in FIG. 7, there are various methods of reducing or increasing the frequency of the phase component. Examples of the method of reducing the frequency of the phase component include a method of multiplying the phase component by a coefficient (hereinafter, referred to as a phase coefficient) smaller than 1.0 for reducing the amplitude of the random phase patch, and a method of filtering the phase component with a low pass filter. In the present embodiment, as illustrated in FIG. 8, a case is illustrated in which a random phase patch having a frequency lower than that of the random phase patch illustrated in FIG. 7 is newly generated by multiplying the random phase patch by a phase coefficient of 0.25.

Figure 8:
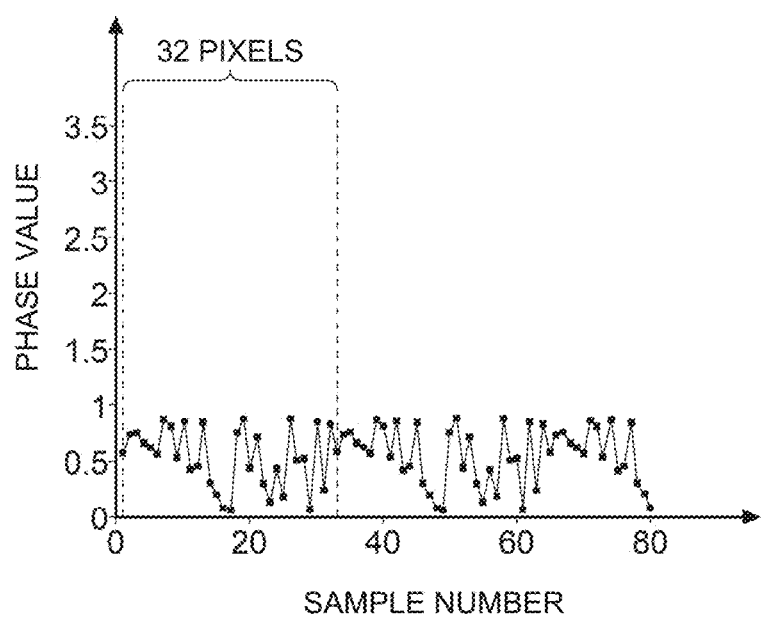
FIG. 8 is a diagram illustrating an example of a frequency-decreased random phase patch according to the first embodiment.

When a phase value is added to each pixel belonging to the OSD object group by using the low-frequency random phase patch as illustrated in FIG. 8, the OSD object C43 can be reproduced with a clearer and deeper depth of field.

Similarly, when a phase value is added to each pixel belonging to the AR object group by using the high-frequency random phase patch as illustrated in FIG. 7, the AR objects C41 and C42 can be reproduced with a shallower depth of field and a lower resolution.

In Step S104 of FIG. 3, the complex field generated by the phase adjustment unit 22 of the pre-processing unit 20 by using the above-described rule is propagated to the SLM plane on the basis of the depth information of the regions C51 to C34 corresponding to each object described using FIG. 5.

Figure 9:
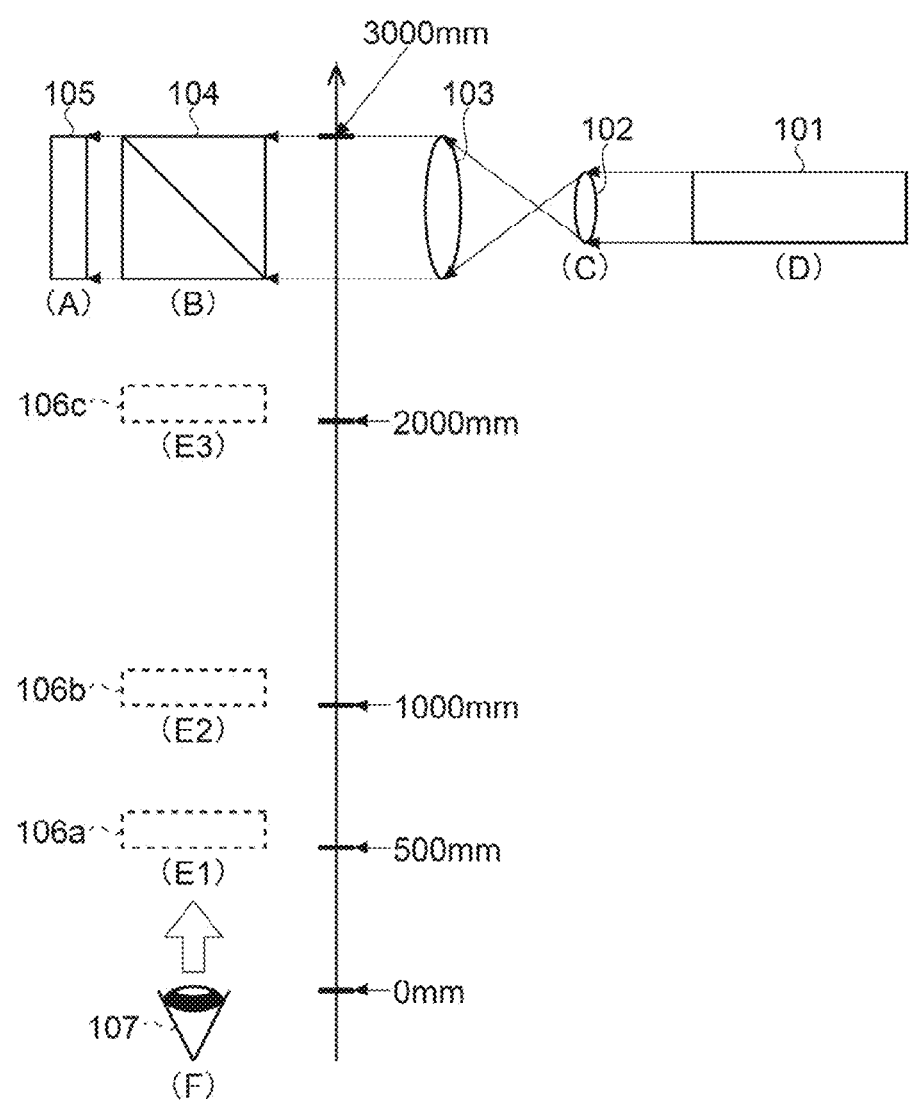
FIG. 9 is a diagram illustrating a positional relationship among a hologram to be reproduced, a hologram display system, and a viewer (user) in the first embodiment.

FIG. 9 is a diagram illustrating a positional relationship among a hologram to be reproduced, the hologram display system, and the viewer (user) in the present embodiment. In FIG. 9, among three holograms 106a to 106c to be reproduced, the hologram 106a positioned at a position E1 corresponds to the OSD object C43 of the clock, the hologram 106b positioned at a position E2 corresponds to the AR object C42 of the baby, and the hologram 106c positioned at a position E3 corresponds to the AR object C41 of the boy.

Each point appearing as a pixel on the SLM plane is obtained by the CGH calculation unit 30 by using a wave propagation formula. As such a wave propagation formula, for example, a Fresnel diffraction formula as shown in following Formula (1) can be used. In Formula (1), z represents a distance from each image (hologram) plane to be reproduced to the spatial light modulator 105.

$$E(x, y, z) = \frac{1}{i\lambda} \int\int_{-\infty}^{+\infty} E(x', y', 0) \frac{e^{ikr}}{r} \cos(\theta) dx' dy' \quad (1)$$

where
$E(x',y',0)$ is the electric field at the aperture,
$r = \sqrt{(x-x')^2 + (y-y')^2 + Z^2}$,
k is the wavenumber $2\pi/\lambda$
i is the imaginary unit.

For example, in FIG. 9, assuming that a distance from the spatial light modulator 105 positioned at a position A to the hologram 106c positioned at the position E3 is 1000 mm, the value of the distance z for the image for displaying the hologram to propagate from the position E3 to the position A is 1000 mm.

Note that a wave propagation function for generating the hologram on the SLM plane is not limited to the wave propagation formula shown in Formula (1). For example, it is also possible to use a diffraction type of Rayleigh Sommerfeld, a diffraction type of Fraunhofer, or the like based on another hypothesis.

Pixels of different depths propagate into the SLM plane separately from each other and are accumulated in the same field on the SLM plane. Examples of the simplest method of integrating fields of different distances into one include a method of integrating the fields. However, a more sophisticated method of integrating fields of different depths can be applied to the present embodiment on the basis of an actual use case.

In Step S105 of FIG. 3, the post-processing described above is executed on the integrated complex field generated in Step S104. Note that in the post-processing, different processing is executed according to the type of the spatial light modulator 105. In the present embodiment using the reflective spatial light modulator 105, a process of directly displaying a complex field can be used.

In a complex value SLM, an amplitude component is quantized in a range of 0 to 255, and a phase component in a range of 0 to $2\pi$ is quantized into discrete values of 255 stages. In the post-processing according to the present embodiment, the complex field is mapped to a signal which can be displayed by the SLM and quantized.

In the mapping of the amplitude information, following Formula (2) can be used. According to Formula (2), a field U generated by the CGH calculation unit 30 is converted into a signal which can be displayed by the SLM.

$$U(x, y) = A(x, y)e^{i\varphi(x,y)}$$
$$M(x, y) = \text{Floor}\left(255 \times \frac{A(x, y)}{A_{max}}\right)$$
$$\theta(x, y) = \text{Floor}\left(255 \times \frac{\varphi(x, y)}{2\pi}\right)$$
(2)

where
U(x,y) is the complex field to be displayed,
A(x,y) is the amplitude component of the field,
ϕ(x,y) is the phase component of the field,
M(x,y) is the quantized amplitude signal to be displayed by the SLM,
$A_{max}$ is the maximum value in A(x,y),
θ(x,y) is the quantized phase value to be displayed by the SLM, and
Floor( ) is a function that takes integer part of the value.

In Step S106 of FIG. 3, the signal that has passed through the spatial light modulator 105 is displayed. In the present example, as illustrated in FIG. 9, the OSD object C43 of the clock is displayed as the hologram 106a at the position E1 positioned at a distance of 500 mm from the user 107 positioned at the position F, the AR object C42 of the baby is displayed as the hologram 106b at the position E2 positioned at a distance of 1000 mm from the user 107, and the AR object C41 of the boy is displayed as the hologram 106c at the position E3 positioned at a distance of 2000 mm from the user 107.

Figure 10:
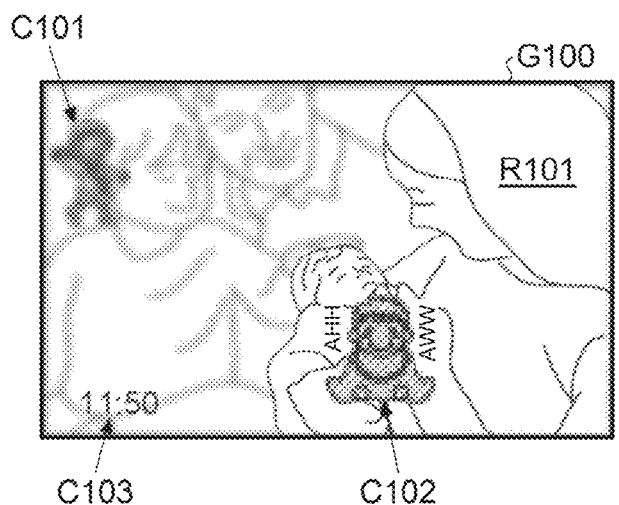
FIG. 10 is a diagram illustrating an example of a hologram displayed to the user according to the first embodiment (the case of looking at a baby in front).
Figure 11:
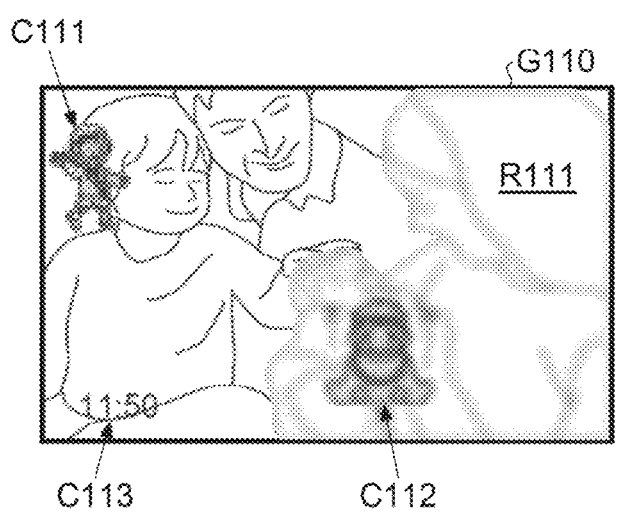
FIG. 11 is a diagram illustrating an example of a hologram displayed to the user according to the first embodiment (the case of looking at a boy in back).

FIGS. 10 and 11 are diagrams illustrating an example of a scene which is visible to the user depending on where the user is looking, that is, where the focal position of the user is, FIG. 10 is a diagram illustrating a scene which is visible to the user in a case where the user is looking at the baby in front, and FIG. 11 is a diagram illustrating a scene which is visible to the user in a case where the user is looking at the boy in back. Note that, in FIGS. 10 and 11, it is assumed that the user directly views the real space via the AR HMD of an optical see-through type with respect to regions R101 and R111 corresponding to the background other than the objects C41 to C43 illustrated in FIG. 4.

As described above, in the present embodiment, high-frequency phase values are added to the AR objects C41 and C42, so that a shallow depth of field is set. Therefore, as in the image G100 illustrated in FIG. 10, in a case where the user 107 is looking at the baby in front, the AR object C102 of the baby is displayed in a clear manner, while the AR object C101 of the boy positioned in back is displayed in a blurred manner. On the other hand, as in the image G110 illustrated in FIG. 11, in a case where the user 107 is looking at the boy in back, the AR object C111 of the boy is displayed in a clear manner, while the AR object C112 of the baby positioned in front is displayed in a blurred manner.

As described above, according to the present embodiment, the user 107 can view the AR object with a visual effect (for example, distance sensing) similar to that of the body present in the real space. Accordingly, the reality of the AR object can be enhanced, and the user experience can be improved.

On the other hand, in the present embodiment, a low-frequency phase value is added to the OSD object C43, so that a deep depth of field is set. Therefore, as illustrated in FIGS. 10 and 11, the OSD objects C103 and C113 of the clock are displayed to the user 107 in a clear manner regardless of where the user 107 is looking.

1.4 Action and Effect

As described above, according to the present embodiment, since it is possible to set appropriate parameters for different points on the same image, it is possible to improve the user experience.

Specifically, since the resolution and the depth of field can be freely set for each object included in the same image, an object with a high resolution and an object with a shallow depth of field can be simultaneously presented to the user. Accordingly, it is possible to reproduce a natural depth blur in the object with a shallow depth of field and to perform clear reproduction easy to view in the object with a high resolution, so that it is possible to improve the user experience provided to the user.

Note that the above-described embodiment is one flexible framework, and it goes without saying that an AR developer can freely adjust the resolution and the depth of field of the object according to the use case of the system that the AR developer is developing. In addition, in the above-described embodiment, a case is illustrated in which the depth of field for each object is adjusted by allocating a phase patch having a different maximum phase difference for each group to which the pixels are distributed, but the present invention is not limited thereto. Various modifications can be made, for example, such that the phase patch of a phase pattern having a different phase difference is allocated or the phase patch having a different phase pattern is allocated for each group.

2. Second Embodiment

Next, an information processing device, an information processing method, and a program according to a second embodiment will be described in detail with reference to the drawings. Note that in the following description, the same configurations as those of the above-described embodiment are denoted by the same reference signs, and redundant description thereof will be omitted.

Figure 12:
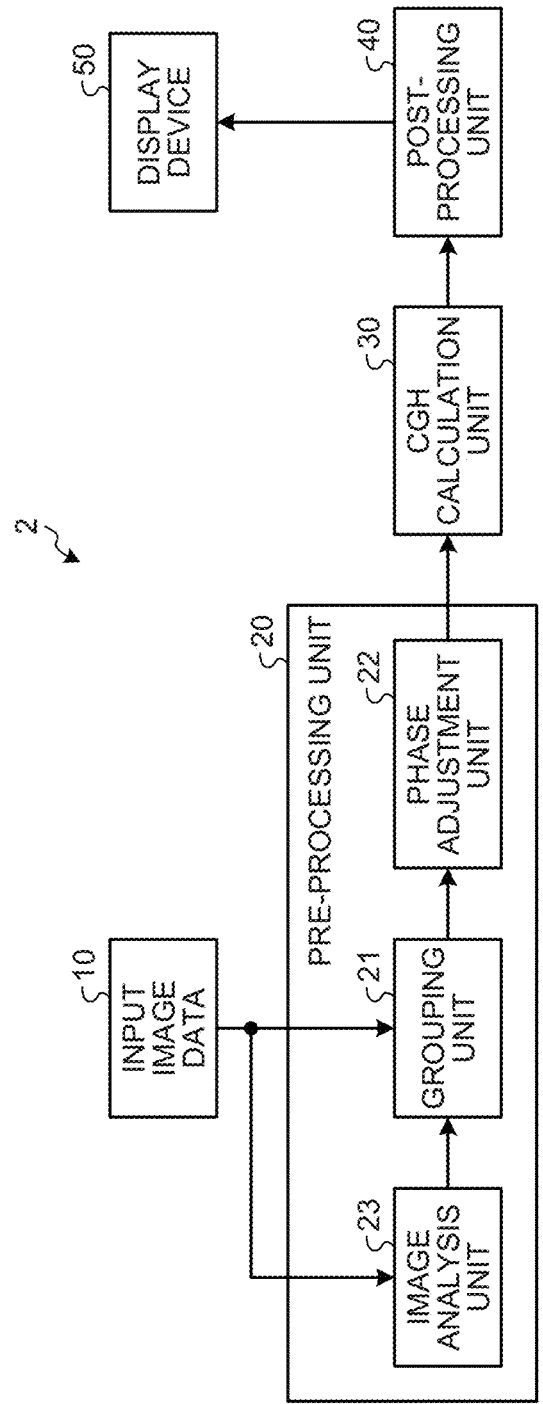
FIG. 12 is a block diagram illustrating a schematic configuration example of an information processing device according to a second embodiment.

FIG. 12 is a block diagram illustrating a schematic configuration example of the information processing device according to the present embodiment. As illustrated in FIG. 12, in a configuration similar to that of the information processing device 1 described with reference to FIG. 2 in the first embodiment, the information processing device 2 according to the present embodiment has a configuration in which the pre-processing unit 20 further includes an image analysis unit 23.

In the present embodiment, unlike the first embodiment, the input image data 10 does not include a label image (see FIG. 6). Instead, in the present embodiment, the pre-processing unit 20 includes the image analysis unit 23.

The image analysis unit 23 analyzes the input image data 10 by machine learning using a neural network such as a convolutional neural network (CNN). For example, the image analysis unit 23 classifies the pixels of the input image data 10 into a plurality of classes by classification, and labels the pixels classified into each class. The label added to the pixel in this manner can be used instead of the label information in the first embodiment.

As the machine learning using the neural network such as a convolutional neural network (CNN), for example, pyramid scene parsing network (PSPNet) or the like can be used. The PSPNet can classify the pixels of the input image data 10 into a plurality of classes by the method described with reference to FIG. 6 in the first embodiment.

Other configurations, operations, and effects may be similar to those of the above-described embodiment, and thus a detailed description thereof will be omitted here.

3. Third Embodiment

Next, an information processing device, an information processing method, and a program according to a third embodiment will be described in detail with reference to the drawings. Note that in the following description, the same configurations as those of the above-described embodiment are denoted by the same reference signs, and redundant description thereof will be omitted.

Figure 13:
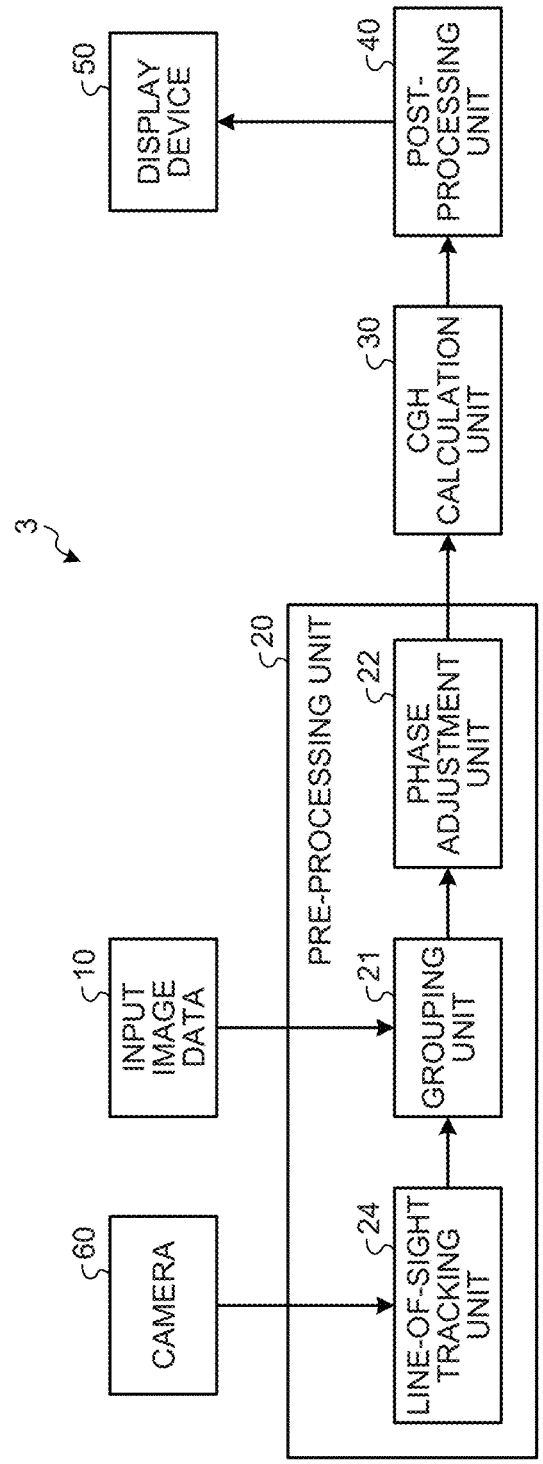
FIG. 13 is a block diagram illustrating a schematic configuration example of an information processing device according to a third embodiment.

FIG. 13 is a block diagram illustrating a schematic configuration example of the information processing device according to the present embodiment. As illustrated in FIG. 13, in a configuration similar to that of the information processing device 1 described with reference to FIG. 2 in the first embodiment, the information processing device 3 according to the present embodiment further includes a camera (imaging unit) 60, and the pre-processing unit 20 further includes a line-of-sight tracking unit 24. Note that in the present embodiment, similarly to the second embodiment, the input image data 10 does not include the label image (see FIG. 6).

The camera 60 images the user 107 who is a viewer, for example. The image data (hereinafter, referred to as a user image) obtained by imaging the user 107 is input to the line-of-sight tracking unit 24 of the pre-processing unit 20. On the other hand, the line-of-sight tracking unit 24 detects the line-of-sight direction of the user by analyzing the input user image.

In the present embodiment, the grouping unit 21 groups the pixels of the input image data 10 on the basis of the line-of-sight information input from the line-of-sight tracking unit 24. For example, the grouping unit 21 according to the present embodiment groups the pixels of the input image data 10 into two groups on the basis of whether or not the pixel corresponds to the object at which the user 107 is currently looking. One group is the group (hereinafter, referred to as a focus group) of the object at which the user 107 is currently looking, and the other group is the group (hereinafter, referred to as an out-of-focus group) of objects that are not included in the object at which the user 107 is currently looking.

Figure 14:
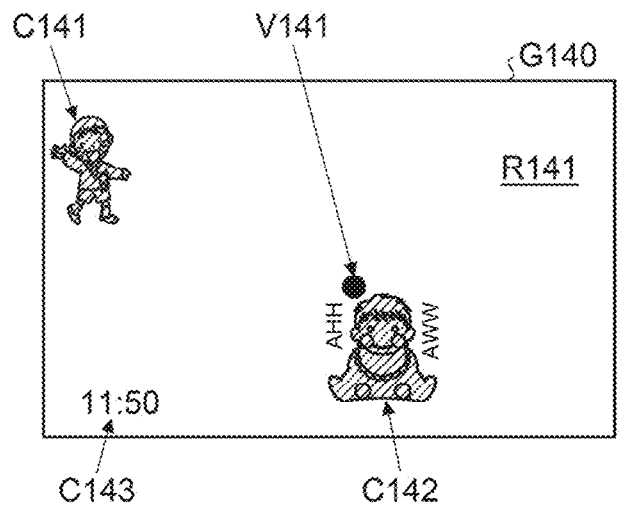
FIG. 14 is a diagram for explaining a line-of-sight direction of the user detected by a line-of-sight tracking unit according to the third embodiment.
Figure 15:
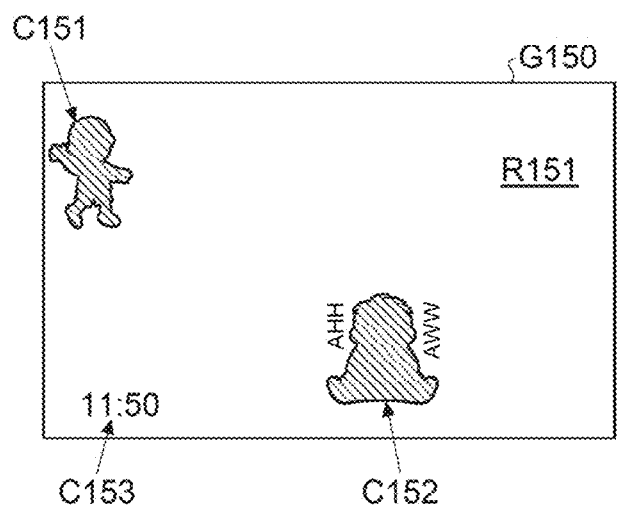
FIG. 15 is a diagram for explaining an example of grouping objects on the basis of the line-of-sight direction illustrated in FIG. 14.

FIG. 14 is a diagram illustrating the portion, which corresponds to a direction in which the user views, in the input image data, and FIG. 15 is a diagram illustrating an example of an image (hereinafter, referred to as a grouped image) corresponding to the label image illustrated in FIG. 6, for example, and is a diagram for explaining an example of grouping objects on the basis of the line-of-sight direction illustrated in FIG. 14.

As illustrated in FIG. 14, in a case where a line of sight V141 of the user 107 is directed toward the AR object C142 of the baby, as illustrated in FIG. 15, the pixels belonging to a region C152 corresponding to the AR object C142 are grouped into the focus group, and AR objects other than the AR object C142, in the present example, the pixels belonging to a region C151 corresponding to the AR object C141 and the pixels belonging to a region C153 corresponding to the OSD object C143 are grouped into the out-of-focus group.

As described above, when the region corresponding to each object is grouped on the basis of the line-of-sight direction of the user 107, the phase value to be added is allocated to the pixels belonging to each group. Since the present example is a case where the user 107 is looking at the baby in front, a low-frequency random phase patch is allocated to the pixels (that is, the pixels belonging to the focus group) corresponding to the AR object C142 in order that the AR object C142 is display in a clear manner with a high resolution.

With respect to the pixels corresponding to the AR object C141 and the pixels corresponding to the OSD object C143 grouped into the out-of-focus group, a high-frequency random phase patch for realizing a shallow depth of field is allocated in order that the pixels are displayed to be blurred to the same extent as the bodies in the real world.

Note that the method of allocating the phase values to the pixels belonging to the focus group and the method of allocating the phase values to the pixels belonging to the out-of-focus group may be, for example, similar to the method described above with reference to FIG. 8, and thus, detailed description thereof will be omitted here.

Figure 16:
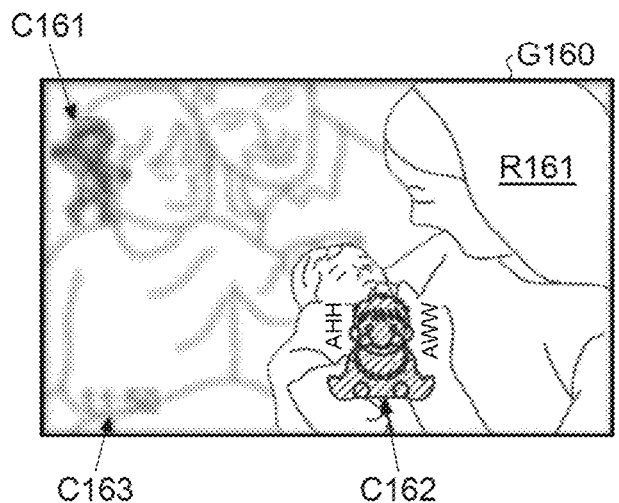
FIG. 16 is a diagram illustrating an example of a hologram displayed to the user according to a third embodiment (the case of looking at the baby in front).
Figure 17:
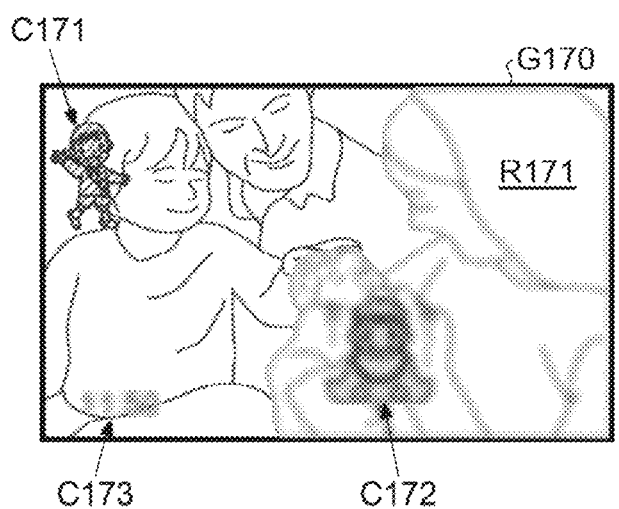
FIG. 17 is a diagram illustrating an example of a hologram displayed to the user according to the third embodiment (the case of looking at the boy in back).

FIGS. 16 and 17 are diagrams illustrating an example of scene which is visible to the user depending on the line-of-sight direction of the user, FIG. 16 is a diagram illustrating a scene which is visible to the user in a case where the line-of-sight direction of the user is directed to the baby in front, and FIG. 17 is a diagram illustrating a scene which is visible to the user in a case where the line-of-sight direction of the user is directed to the boy in back. Note that, in FIGS. 16 and 17, it is assumed that the user directly views the real space via the AR HMD of an optical see-through type with respect to regions R161 and R171 corresponding to the background other than the objects C141 to C143 illustrated in FIG. 14.

In a case where the line-of-sight direction of the user 107 is directed to the baby in front as in the image G160 illustrated in FIG. 16, low-frequency phase information is added to the pixels grouped into the focus group and corresponding to the AR object C142 of the baby. As a result, the AR object C162 of the baby at which the user 107 is looking is displayed in a clear manner with a deep depth of field.

On the other hand, with respect to the pixels grouped into the out-of-focus group and corresponding to the AR object C141 of the boy and the OSD object C143 of the clock, the depth of field is set to be shallow by adding high-frequency phase information. As a result, the AR object C161 of the boy and the OSD object C163 of the clock are displayed in a blurred manner.

On the other hand, as in the image G170 illustrated in FIG. 17, in a case where the line-of-sight direction of the user 107 is directed toward the boy in back, low-frequency phase information is added to the pixels grouped into the focus group and corresponding to the AR object C141 of the boy. As a result, the AR object C171 of the boy at which the user 107 is looking is displayed in a clear manner with a deep depth of field.

On the other hand, with respect to the pixels grouped in the out-of-focus group and corresponding to the AR object C142 of the baby and the OSD object C143 of the clock, the depth of field is set to be shallow by adding high-frequency phase information. As a result, the AR object C171 of the baby and the OSD object C173 of the clock are displayed in a blurred manner.

Note that the OSD object C143 may be always displayed with a high resolution and a deep depth of field regardless of the line-of-sight direction of the user 107. In that case, the region C153 corresponding to the OSD object C143 may be grouped into a group (hereinafter, referred to as an OSD group) different from the focus group and the out-of-focus group.

Other configurations, operations, and effects may be similar to those of the above-described embodiment, and thus a detailed description thereof will be omitted here.

4. Fourth Embodiment

Next, an information processing device, an information processing method, and a program according to a fourth embodiment will be described in detail with reference to the drawings. Note that in the following description, the same configurations as those of the above-described embodiment are denoted by the same reference signs, and redundant description thereof will be omitted.

Figure 18:
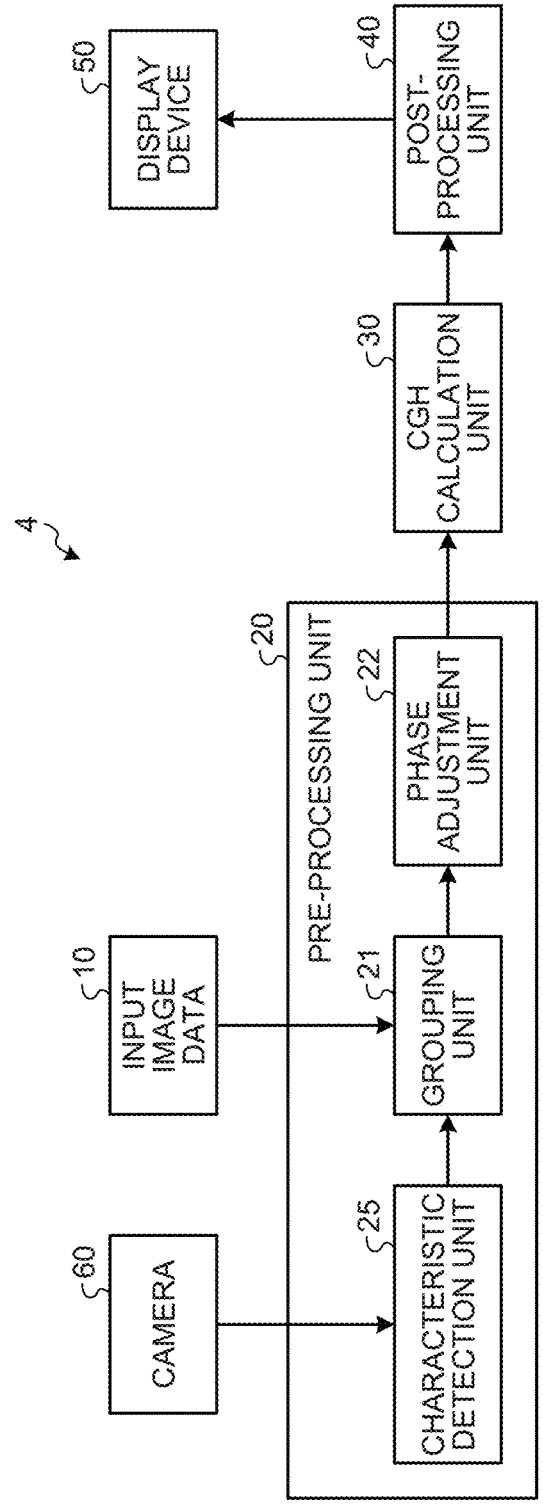
FIG. 18 is a block diagram illustrating a schematic configuration example of an information processing device according to a fourth embodiment.

FIG. 18 is a block diagram illustrating a schematic configuration example of the information processing device according to the present embodiment. As illustrated in FIG. 18, in a configuration similar to that of the information processing device 1 described with reference to FIG. 2 in the first embodiment, the information processing device 4 according to the present embodiment further includes the camera 60, and the pre-processing unit 20 further includes a characteristic detection unit 25. Note that in the present embodiment, similarly to the second embodiment, the input image data 10 does not include the label image (see FIG. 6).

For example, the camera 60 images the surroundings of the user 107 including the viewing angle of the user 107. The characteristic detection unit 25 generates a characteristic map indicating which region in the real space is likely to be viewed by the user 107 on the basis of an image (hereinafter, referred to as a surrounding image) around the user 107 imaged by the camera 60. The region that is likely to be viewed by the user 107 is, for example, a region that is likely to attract the attention of the user 107, and a high charac-teristic value can be set in this region in the characteristic map generated by the characteristic detection unit 25.

Figure 19:
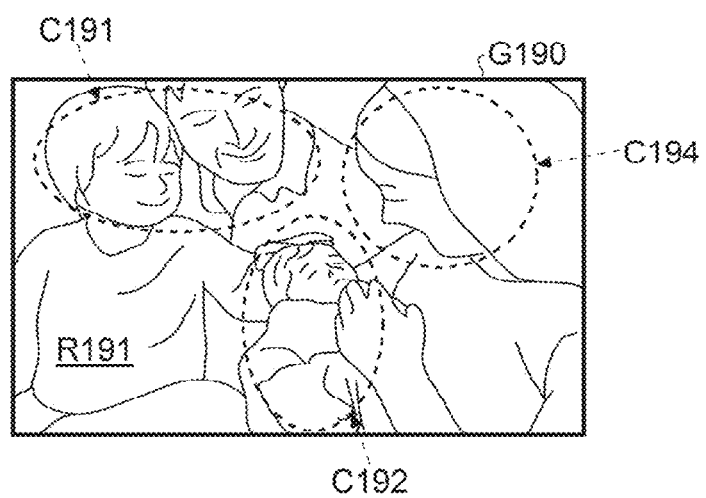
FIG. 19 is a view illustrating an example of a surrounding image acquired by a camera according to the fourth embodiment.
Figure 20:
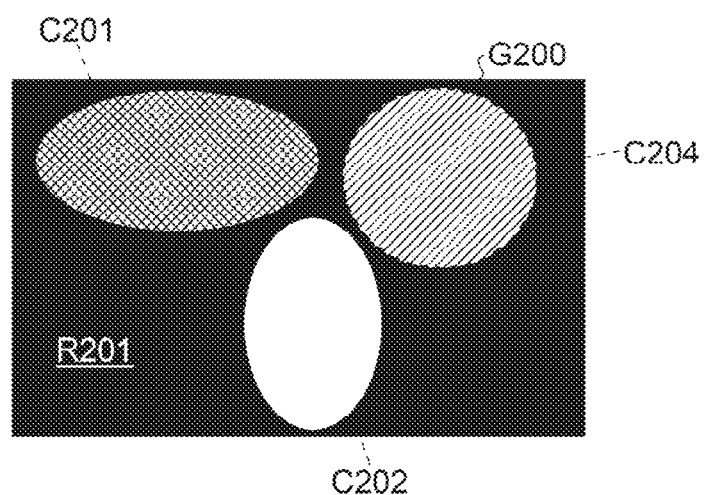
FIG. 20 is a diagram illustrating an example of a characteristic map generated on the basis of a surrounding image by a characteristic detection unit according to the fourth embodiment.

FIG. 19 is a diagram illustrating an example of the surrounding image acquired by the camera, and FIG. 20 is a diagram illustrating an example of the characteristic map generated on the basis of the surrounding image by the characteristic detection unit according to the present embodiment.

As illustrated in FIG. 19, the angle of view of the camera 60 includes, for example, the viewing angle of the user 107. The angle of view of the camera 60 is not necessarily wider than the viewing angle of the user 107. The characteristic detection unit 25 generates a characteristic map on the basis of the surrounding image input from the camera 60 as illustrated in FIG. 20.

In the present example, as in a characteristic map G200 illustrated in FIG. 20, for example, the highest characteristic value is set for a region C202 corresponding to a region C192 of a baby in a surrounding image G190 illustrated in FIG. 19, the next highest characteristic value is set for a region C204 corresponding to a region C194 of a female, and the next highest characteristic value is set for a region C201 corresponding to a region C191 of a boy and a male.

Figure 21:
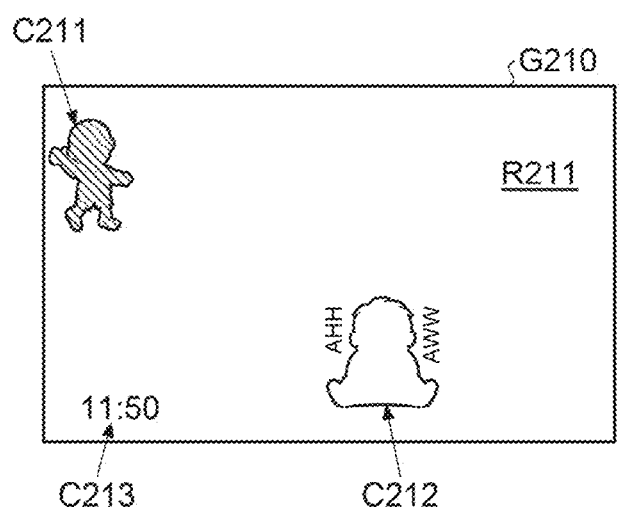
FIG. 21 is a diagram for explaining an example of grouping of objects according to the fourth embodiment.

The grouping unit 21 according to the present embodiment groups the AR objects from a positional relationship between the regions C201, C202, and C204 and the AR objects in the input image data 10 on the basis of the characteristic map G200 generated as described above. For example, as illustrated in FIG. 21, the grouping unit 21 may group the pixels corresponding to the AR object C212 of the baby corresponding to the region C202 of the characteristic map G200 into a group (hereinafter, referred to as a high attention group) with the highest attention degree, and may group the pixels corresponding to the other objects, in the present example, the AR object C211 of the boy and the OSD object C213 of the clock into a group (hereinafter, referred to as a low attention group) with a low attention degree.

In order that the AR object C202 having a high attention degree is always displayed in a clear manner with a high resolution, the phase adjustment unit 22 adds a low-frequency phase value to the pixels grouped into the high attention group by the method described with reference to FIG. 8.

On the other hand, in a normal state, in order that the AR object C201 with a low attention degree is displayed in a blurred manner without discomfort, the phase adjustment unit 22 adds a high-frequency phase value to the pixels grouped into the low attention group by the method described with reference to FIG. 7. Note that an abnormal state opposite to the normal state may be a state where the user 107 gazes at a body in the real space corresponding to an AR object different from the AR object grouped into the high attention group.

Figure 22:
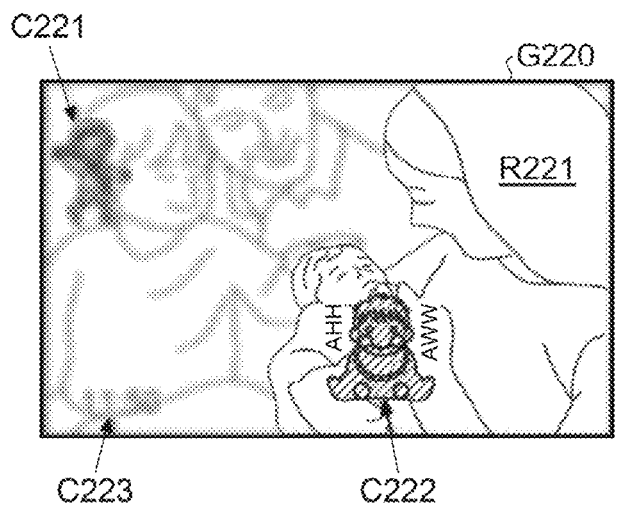
FIG. 22 is a diagram illustrating an example of a hologram displayed to the user according to the fourth embodiment (the case of looking at the baby in front).
Figure 23:
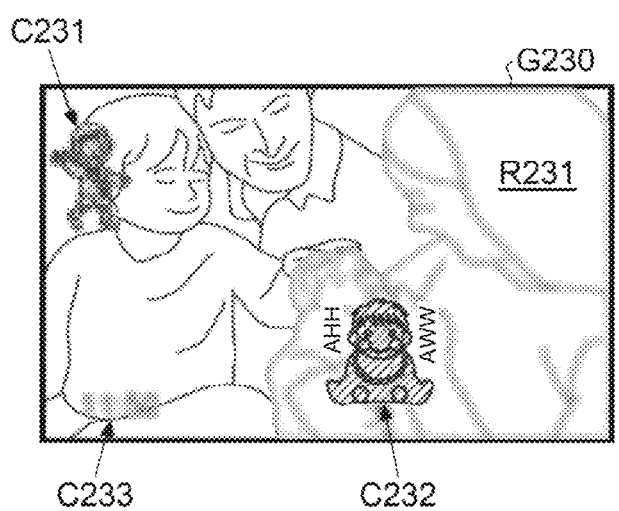
FIG. 23 is a diagram illustrating an example of a hologram displayed to the user according to the fourth embodiment (the case of looking at the boy in back).

FIGS. 22 and 23 are diagrams illustrating an example of scene which is visible to the user depending on the line-of-sight direction of the user, FIG. 22 is a diagram illustrating a scene which is visible to the user in a case where the line-of-sight direction of the user is directed to the baby in front, and FIG. 23 is a diagram illustrating a scene which is visible to the user in a case where the line-of-sight direction of the user is directed to the boy in back. Note that, in FIGS. 22 and 23, it is assumed that the user directly views the real space via the AR HMD of an optical see-through type with respect to regions R221 and R231 corresponding to the background other than the objects C211 to C213 illustrated in FIG. 21.

In FIGS. 22 and 23, since a low-frequency random phase patch is allocated to the AR objects C222 and C232 of the baby with a high attention degree, the AR objects C222 and C232 of the baby are displayed in a clear manner with a deep depth of field regardless of where the user 107 is looking.

On the other hand, since a high-frequency random phase patch is allocated to the AR objects C221 and C231 of the boy with a low attention degree, the AR objects C222 and C232 of the boy are displayed with a shallow depth of field. Accordingly, in a case where the user 107 is looking at the boy, the AR object C231 of the boy is displayed in a clear manner as illustrated in FIG. 23, but in a case where the user 107 is not looking at the boy but looking at the baby, for example, the AR object C231 of the boy is displayed in a blurred manner as illustrated in FIG. 22.

The present embodiment is considered to be particularly effective, for example, in a case where the user 107 always pays high attention or needs to pay high attention to a specific body in the real space. Even in that case, since the AR object for a body to which the user 107 does not pay attention is displayed with a definition according to the focal position of the user 107 or the like, it is possible to provide a user experience without discomfort.

Other configurations, operations, and effects may be similar to those of the above-described embodiment, and thus a detailed description thereof will be omitted here.

5. Fifth Embodiment

Next, an information processing device, an information processing method, and a program according to a fifth embodiment will be described in detail with reference to the drawings. Note that in the following description, the same configurations as those of the above-described embodiment are denoted by the same reference signs, and redundant description thereof will be omitted.

The information processing device according to the present embodiment may have a configuration similar to that of the information processing device 3 according to the third embodiment described above, for example. However, the information processing device according to the present embodiment executes the following operation.

Figure 24:
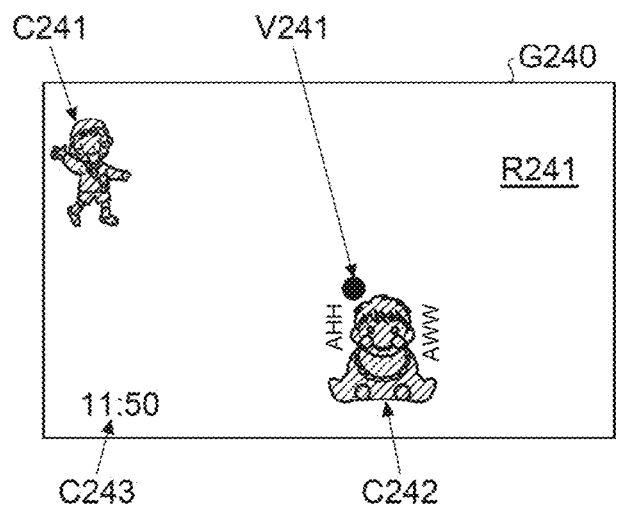
FIG. 24 is a diagram for explaining a line-of-sight direction of the user detected by a line-of-sight tracking unit according to a fifth embodiment.
Figure 25:
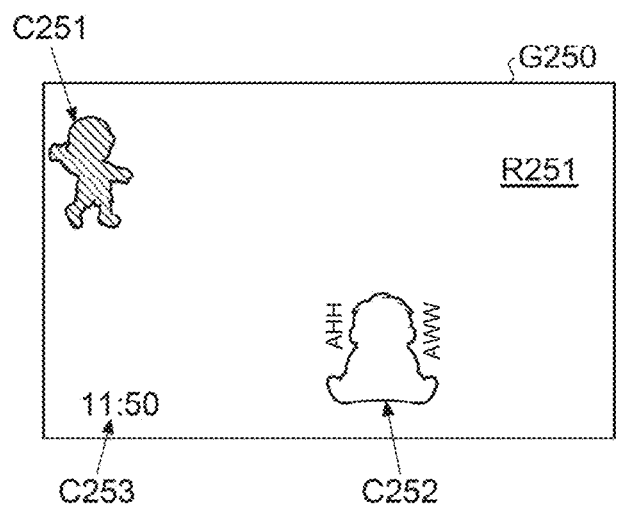
FIG. 25 is a diagram for explaining an example of grouping objects on the basis of the line-of-sight direction illustrated in FIG. 24.

FIGS. 24 and 25 are diagrams for explaining the operation executed by the information processing device according to the present embodiment, FIG. 24 is a diagram illustrating the portion, which corresponds to a direction in which the user views, in the input image data, and FIG. 25 is a diagram for explaining an example of grouping objects on the basis of the line-of-sight direction illustrated in FIG. 24.

As illustrated in FIG. 24, in the present embodiment, the line-of-sight tracking unit 24 detects the line-of-sight direction of the user 107 on the basis of the image acquired by the camera 60, similarly to the third embodiment.

On the other hand, as illustrated in FIG. 25, the grouping unit 21 according to the present embodiment groups the depth images in the input image data 10 on the basis of the depth information of each pixel. In the present example, similarly to the above-described example, an object image G240 includes an AR object C241 of a boy, an AR object C242 of a baby, and an OSD object C243 of a clock, and different depth information is added to each object in the depth image F160. For example, depth information indicating that a distance from the user 107 is 2000 mm is added to a region C251 corresponding to the AR object C241 of the boy, depth information indicating that a distance from the user 107 is 1000 mm is added to a region C252 corresponding to the AR object C242 of the baby, and depth information indicating that a distance from the user 107 is 500 mm is added to a region C253 corresponding to the OSD object C243 of the clock.

In such a case, the grouping unit 21 groups the regions of the objects of the input image data 10 on the basis of the region C251 corresponding to the AR object C241 of the boy, the region C252 corresponding to the AR object C242 of the baby, and the region C253 corresponding to the OSD object C243 of the clock in the depth image G250.

As described above, by using the depth information included in the input image data 10, the grouping unit 21 can easily group the pixels of the input image data 10.

Similarly to the above-described embodiment, the phase adjustment unit 22 adds the phase value corresponding to a line-of-sight direction V241 of the user 107 to the pixels belonging to each group on the basis of the group for each distance generated as described above.

Note that, in the present embodiment, a lookup table as illustrated in Table 1 below is used to set the phase value for each grouped pixel.

TABLE 1

| | Group (Distance) | | | | | | |
|---|---|---|---|---|---|---|---|
| | −1750 to −1251 | −1250 to −751 | −750 to −251 | −250 to +250 | +251 to +750 | +751 to +1250 | +1251 to +1750 |
| Maximum phase difference | $\frac{2}{3}\pi$ | $1\pi$ | $\frac{1}{4}\pi$ | $0\pi$ | $\frac{1}{4}\pi$ | $1\pi$ | $\frac{2}{3}\pi$ |

As illustrated in Table 1, in the lookup table, a maximum phase difference in the patch is defined for each distance from the body positioned in the line-of-sight direction V241 of the user 107, that is, the body at which the user 107 is looking. Note that the random phase patch allocated to a cell of a predetermined size may be the random phase patch described above with reference to FIG. 8 or a random phase patch obtained by adjusting the random phase patch on the basis of the maximum phase difference specified from the lookup table (see, for example, FIG. 7).

Therefore, as illustrated in FIG. 24, in a case where the user 107 is looking at the baby positioned at a distance of 1000 mm from the user, a random phase patch (see, for example, FIG. 7) in which the maximum phase difference in the patch is set to $1\pi$ is allocated to the pixels belonging to the group corresponding to the AR object C241 of the boy positioned 1000 mm away from the baby, and a random phase patch (see, for example, FIG. 8) in which the maximum phase difference in the patch is set to $\frac{1}{4}\pi$ is allocated to the pixels belonging to the group corresponding to the OSD object C243 of the clock positioned 500 mm away from the baby.

Note that a maximum phase difference in the patch of $0\pi$, that is, a constant phase value with no phase difference is allocated to the pixels belonging to the group corresponding to the AR object C242 of the baby at which the user 107 is looking.

As described above, the phase difference corresponding to the distance from the body at which the user 107 is looking is provided to each object on the basis of the lookup table, so that the following user experience can be provided.

Figure 26:
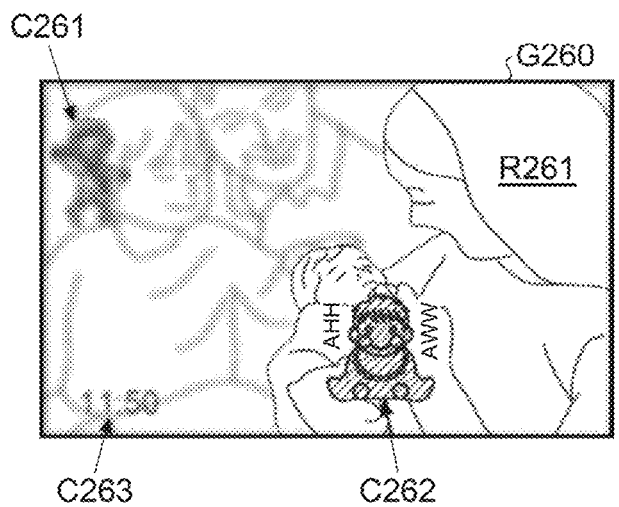
FIG. 26 is a diagram illustrating an example of a hologram displayed to the user according to the fifth embodiment (the case of looking at the baby in front).
Figure 27:
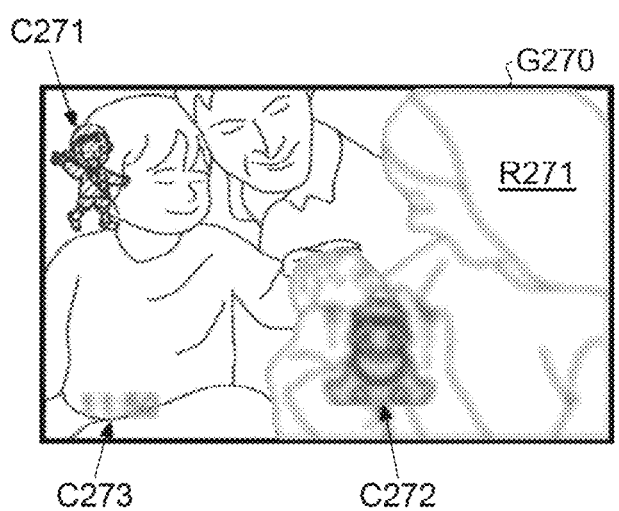
FIG. 27 is a diagram illustrating an example of a hologram displayed to the user according to the fifth embodiment (the case of looking at the boy in back).

FIGS. 26 and 27 are diagrams for explaining a user experience provided to the user according to the present embodiment, FIG. 26 is a diagram illustrating a scene which is visible to the user in a case where the user is looking at the baby in front, and FIG. 27 is a diagram illustrating a scene which is visible to the user in a case where the user is looking at the boy in back. Note that, in FIGS. 26 and 27, it is assumed that the user directly views the real space via the AR HMD of an optical see-through type with respect to regions R261 and R271 corresponding to the background other than the objects C241 to C243 illustrated in FIG. 24.

In a case where the line-of-sight direction of the user 107 is directed to the baby in front as in the image G260 illustrated in FIG. 26, a random phase patch of a considerably low frequency (no phase difference in the present example) is allocated to the pixels corresponding to the AR object C242 of the baby. As a result, the AR object C262 of the baby at which the user 107 is looking is displayed in a clear manner with a deep depth of field.

On the other hand, a high-frequency random phase patch having the maximum phase difference in the patch corresponding to the distance of each body from the baby (or the user 107) is allocated to the pixels corresponding to the objects C241 and C243 of the bodies (in the present example, the boy and the clock) having a distance from the user 107 different from that of the baby, so that the depth of field is set shallow. For example, a high-frequency random phase patch having the maximum phase difference of $1\pi$ corresponding to the range to which a distance of +1000 mm from the baby belongs is allocated to the pixels corresponding to the AR object C241 of the boy on the basis of the lookup table of Table 1, and a high-frequency random phase patch having the maximum phase difference of $\frac{1}{4}\pi$ corresponding to the range to which a distance of −500 mm from the baby belongs is allocated to the pixels corresponding to the OSD object C243 of the clock on the basis of the lookup table of Table 1. As a result, objects (an AR object C261 of the boy and an OSD object C263 of the clock) for these bodies are displayed in a blurred manner.

On the other hand, in a case where the line-of-sight direction of the user 107 is directed to the boy in back as in the image G270 illustrated in FIG. 27, a random phase patch of a considerably low frequency (no phase difference in the present example) is allocated to the pixels corresponding to the AR object C242 of the boy. As a result, the AR object C272 of the boy at which the user 107 is looking is displayed in a clear manner with a deep depth of field.

On the other hand, a high-frequency random phase patch having the maximum phase difference in the patch corresponding to the distance of each body from the boy (or the user 107) is allocated to the pixels corresponding to the objects C241 and C243 of the bodies (in the present example, the baby and the clock) having a distance from the user 107 different from that of the boy, so that the depth of field is set shallow. For example, a high-frequency random phase patch having the maximum phase difference of $1\pi$ corresponding to the range to which a distance of −1000 mm from the boy belongs is allocated to the pixels corresponding to the AR object C242 of the baby on the basis of the lookup table of Table 1, and a high-frequency random phase patch having the maximum phase difference of $\frac{2}{3}\pi$ corresponding to the range to which a distance of −1500 mm from the baby belongs is allocated to the pixels corresponding to the OSD object C243 of the clock on the basis of the lookup table of Table 1. As a result, objects (an AR object C272 of the baby and an OSD object C273 of the clock) for these bodies are displayed in a blurred manner.

Other configurations, operations, and effects may be similar to those of the above-described embodiment, and thus a detailed description thereof will be omitted here.

6. Hardware Configuration

Figure 28:
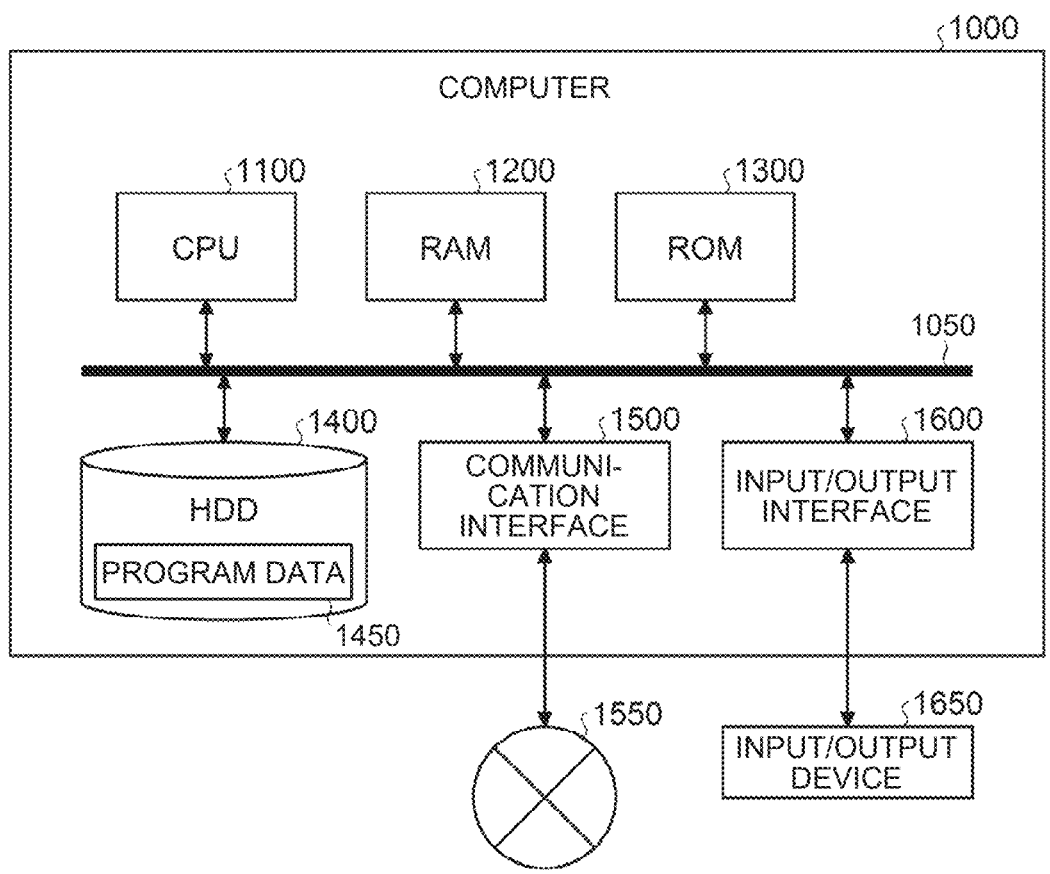
FIG. 28 is a block diagram illustrating a hardware configuration example of the information processing device according to the embodiment.

The information processing device according to the embodiment, the modifications thereof, and the application examples described above can be realized by a computer 1000 having a configuration as illustrated in FIG. 28, for example. FIG. 28 is a hardware configuration diagram illustrating an example of the computer 1000 that realizes the functions of the information processing device according to the above-described embodiment. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops the program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on the hardware of the computer 1000, and the like.

The HDD 1400 is a computer-readable recording medium that non-transiently records a program executed by the CPU 1100, data used by the program, and the like. Specifically, the HDD 1400 is a recording medium that records a projection control program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. In addition, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device according to the above-described embodiment, the CPU 1100 of the computer 1000 realizes the functions of the pre-processing unit 20, the CGH calculation unit 30, and the post-processing unit 40 by executing a program loaded on the RAM 1200. In addition, the HDD 1400 stores a program and the like according to the present disclosure. Incidentally, the CPU 1100 reads the program data 1450 from the HDD 1400 and executes the program data, but as another example, these programs may be acquired from another device via the external network 1550.

Although each of the embodiments of the present disclosure has been described above, the technical scope of the present disclosure is not limited to each of the above-described embodiments as it is, and various modifications may be made without departing from the gist of the present disclosure. Further, the component may be combined suitably over different embodiments and the modification.

The effects in each embodiment described in this specification are merely examples and are not limited, and other effects may be present.

Incidentally, the present technique may also be configured as below.

(1)
An information processing device comprising:
a grouping unit that groups a plurality of pixels configuring one or more objects included in one piece of image data into one or more groups;
a phase adjustment unit that allocates, to the plurality of pixels, a phase pattern having a phase difference different for each of the one or more groups; and
a calculation unit that generates hologram data from the image data to which the phase pattern is added.

(2)
The information processing device according to (1), wherein the phase adjustment unit allocates, to the plurality of pixels, the phase pattern having a maximum phase difference different for each of the one or more groups.

(3)
The information processing device according to (1) or (2), wherein
the image data includes label information regarding the one or more objects, and
the grouping unit groups the plurality of pixels into the one or more groups on a basis of the label information.

(4)
The information processing device according to (1), further comprising:
an image analysis unit that analyzes the image data to add a label to each pixel configuring the image data, wherein
the grouping unit groups the plurality of pixels into the one or more groups on a basis of the label added by the image analysis unit.

(5)
The information processing device according to (1), further comprising:
a line-of-sight tracking unit that detects a line-of-sight direction of a user, wherein
the grouping unit groups pixels configuring an object, which is associated with a body positioned in the line-of-sight direction in a real space, among the one or more objects into a first group, and groups pixels configuring an object, which is associated with a body not positioned in the line-of-sight direction, into a second group.

(6)
The information processing device according to (1), further comprising:
an imaging unit that images surroundings of a user; and
a characteristic detection unit that detects characteristics of bodies present around the user by analyzing image data acquired by the imaging unit, wherein
the grouping unit groups the plurality of pixels configuring the one or more objects associated with the bodies into the one or more groups on a basis of the characteristics of the bodies detected by the characteristic detection unit.

(7)
The information processing device according to (1), wherein
the image data includes depth information of each pixel configuring the image data, and
the grouping unit groups the plurality of pixels into the one or more groups on a basis of the depth information.

(8)
The information processing device according to (7), further comprising:
a line-of-sight tracking unit that detects a line-of-sight direction of a user;
a storage unit that stores a lookup table that holds a correspondence relationship between a distance and a phase difference, wherein
the phase adjustment unit determines the phase difference of the phase pattern to be added to the pixels belonging to each of the one or more groups, by referring to the lookup table on a basis of a distance between a body associated with an object configured by the pixels grouped into each of the one or more groups and a body positioned in the line-of-sight direction in a real space.

(9)
The information processing device according to any one of (1) to (7), wherein
the phase adjustment unit
allocates a first phase pattern having the phase difference of a first phase difference to pixels grouped into a first group by the grouping unit, and
allocates a second phase pattern having the phase difference of a second phase difference larger than the first phase difference to pixels grouped into a second group.

(10)
The information processing device according to any one of (1) to (9), wherein
the phase pattern has a predetermined pixel size, and
the phase adjustment unit allocates the phase pattern in units of cells obtained by dividing the image data into the predetermined pixel size.

(11)
The information processing device according to any one of (1) to (10), wherein the phase pattern is a random phase pattern in which a difference between phase values added to adjacent pixels is a random value.

(12)
The information processing device according to any one of (1) to (11), wherein the one or more objects include a first object associated with a body in a real space and a second object displayed on a virtual screen set in the real space.

(13)
The information processing device according to (12), wherein the phase adjustment unit allocates a low-frequency phase pattern having the small phase difference to pixels corresponding to the second object.

(14)
An information processing method comprising:
grouping a plurality of pixels configuring one or more objects included in one piece of image data into one or more groups;
allocating, to the plurality of pixels, a phase pattern having a phase difference different for each of the one or more groups; and
generating hologram data from the image data to which the phase pattern is added.

(15)

A program for causing a computer that generates hologram data for displaying a hologram from image data to execute:
grouping a plurality of pixels configuring one or more objects included in one piece of image data into one or more groups;
allocating, to the plurality of pixels, a phase pattern having a phase difference different for each of the one or more groups; and
generating hologram data from the image data to which the phase pattern is added.

(16)

A hologram display system comprising:
the information processing device according to any one of (1) to (13); and
a display device that displays a hologram for a user on a basis of the hologram data generated by the information processing device.

(17)

The hologram display system according to (16), wherein
the information processing device further includes a post-processing unit that converts the hologram data into a hologram signal capable of being stereoscopically displayed on the display device, and
the display device includes a spatial light modulator that modulates light output on a basis of the hologram signal to display the hologram to the user.

(18)

The hologram display system according to (17), wherein the spatial light modulator is a reflective spatial light modulator.

REFERENCE SIGNS LIST 1, 2, 3, 4 INFORMATION PROCESSING DEVICE
10 INPUT IMAGE DATA
20 PRE-PROCESSING UNIT
21 GROUPING UNIT
22 PHASE ADJUSTMENT UNIT
23 IMAGE ANALYSIS UNIT
24 LINE-OF-SIGHT TRACKING UNIT
25 CHARACTERISTIC DETECTION UNIT
30 CGH CALCULATION UNIT
40 POST-PROCESSING UNIT
50 DISPLAY DEVICE
60 CAMERA
101 LIGHT SOURCE
102, 103 LENS
104 BEAM SPLITTER
105 SPATIAL LIGHT MODULATOR (SLM)
106, 106a, 106b, 106c HOLOGRAM
107 USER

The invention claimed is:

1. An information processing device comprising:
a grouping unit that groups a plurality of pixels configuring one or more objects included in one piece of image data into one or more groups;
a phase adjustment unit that allocates, to the plurality of pixels, a phase pattern having a phase difference different for each of the one or more groups; and
a calculation unit that generates hologram data from the image data to which the phase pattern is added.

2. The information processing device according to claim 1, wherein the phase adjustment unit allocates, to the plurality of pixels, the phase pattern having a maximum phase difference different for each of the one or more groups.

3. The information processing device according to claim 1, wherein
the image data includes label information regarding the one or more objects, and
the grouping unit groups the plurality of pixels into the one or more groups on a basis of the label information.

4. The information processing device according to claim 1, further comprising:
an image analysis unit that analyzes the image data to add a label to each pixel configuring the image data, wherein
the grouping unit groups the plurality of pixels into the one or more groups on a basis of the label added by the image analysis unit.

5. The information processing device according to claim 1, further comprising:
a line-of-sight tracking unit that detects a line-of-sight direction of a user, wherein
the grouping unit groups pixels configuring an object, which is associated with a body positioned in the line-of-sight direction in a real space, among the one or more objects into a first group, and groups pixels configuring an object, which is associated with a body not positioned in the line-of-sight direction, into a second group.

6. The information processing device according to claim 1, further comprising:
an imaging unit that images surroundings of a user; and
a characteristic detection unit that detects characteristics of bodies present around the user by analyzing image data acquired by the imaging unit, wherein
the grouping unit groups the plurality of pixels configuring the one or more objects associated with the bodies into the one or more groups on a basis of the characteristics of the bodies detected by the characteristic detection unit.

7. The information processing device according to claim 1, wherein
the image data includes depth information of each pixel configuring the image data, and
the grouping unit groups the plurality of pixels into the one or more groups on a basis of the depth information.

8. The information processing device according to claim 7, further comprising:
a line-of-sight tracking unit that detects a line-of-sight direction of a user;
a storage unit that stores a lookup table that holds a correspondence relationship between a distance and a phase difference, wherein
the phase adjustment unit determines the phase difference of the phase pattern to be added to the pixels belonging to each of the one or more groups, by referring to the lookup table on a basis of a distance between a body associated with an object configured by the pixels grouped into each of the one or more groups and a body positioned in the line-of-sight direction in a real space.

9. The information processing device according to claim 1, wherein
the phase adjustment unit
allocates a first phase pattern having the phase difference of a first phase difference to pixels grouped into a first group by the grouping unit, and
allocates a second phase pattern having the phase difference of a second phase difference larger than the first phase difference to pixels grouped into a second group.

10. The information processing device according to claim 1, wherein
the phase pattern has a predetermined pixel size, and
the phase adjustment unit allocates the phase pattern in units of cells obtained by dividing the image data into the predetermined pixel size.

11. The information processing device according to claim 1, wherein the phase pattern is a random phase pattern in which a difference between phase values added to adjacent pixels is a random value.

12. The information processing device according to claim 1, wherein the one or more objects include a first object associated with a body in a real space and a second object displayed on a virtual screen set in the real space.

13. The information processing device according to claim 12, wherein the phase adjustment unit allocates a low-frequency phase pattern having the small phase difference to pixels corresponding to the second object.

14. An information processing method comprising:
grouping a plurality of pixels configuring one or more objects included in one piece of image data into one or more groups;
allocating, to the plurality of pixels, a phase pattern having a phase difference different for each of the one or more groups; and
generating hologram data from the image data to which the phase pattern is added.

15. A program for causing a computer that generates hologram data for displaying a hologram from image data to execute:
grouping a plurality of pixels configuring one or more objects included in one piece of image data into one or more groups;
allocating, to the plurality of pixels, a phase pattern having a phase difference different for each of the one or more groups; and
generating hologram data from the image data to which the phase pattern is added.

16. A hologram display system comprising:
the information processing device according to claim 1; and
a display device that displays a hologram for a user on a basis of the hologram data generated by the information processing device.

17. The hologram display system according to claim 16, wherein
the information processing device further includes a post-processing unit that converts the hologram data into a hologram signal capable of being stereoscopically displayed on the display device, and
the display device includes a spatial light modulator that modulates light output on a basis of the hologram signal to display the hologram to the user.

18. The hologram display system according to claim 17, wherein the spatial light modulator is a reflective spatial light modulator.

* * * * *